United States Patent [19]
Suzuki

[11] Patent Number: 4,527,547
[45] Date of Patent: Jul. 9, 1985

[54] SOLAR HEAT COLLECTOR
[75] Inventor: Kazuma Suzuki, Kumagaya, Japan
[73] Assignee: Kabushiki Kaisha Riken, Japan
[21] Appl. No.: 439,560
[22] Filed: Nov. 5, 1982
[30] Foreign Application Priority Data
  Jan. 22, 1982 [JP] Japan .............................. 57-7390[U]
  Feb. 3, 1982 [JP] Japan ............................. 57-13026[U]
[51] Int. Cl.$^3$ ........................... F24J 3/02; F28F 3/14; B21D 53/00
[52] U.S. Cl. ................................... 126/444; 165/170; 128/157; 29/157.3 V
[58] Field of Search ................................ 165/170, 171; 29/157.3 V, 157.3 D; 228/157; 219/121 EC, 121 ED, 121 LC, 121 LD; 126/444, 445, 448

[56] References Cited
U.S. PATENT DOCUMENTS
  2,514,469  7/1950  Burkhardt .................... 29/157.3 V
  4,066,121  1/1978  Kleine .............................. 126/444

FOREIGN PATENT DOCUMENTS
  2031319  4/1980  United Kingdom ........ 219/121 ED

Primary Examiner—Francis K. Zugel
Assistant Examiner—G. Anderson
Attorney, Agent, or Firm—Finnegan, Henderson, Farabow, Garrett & Dunner

[57] ABSTRACT

A solar heat collector is composed of a pair of solar collector panels welded by a laser beam along a plurality of spaced seams. A fluid under pressure is introduced between the solar collector panels to bulge them until a plurality of heat-transfer medium passages are defined between the welded seams. The welded seams have at their ends a plurality of circular or oblong welded seams which serve to prevent the ends of the spaced seams from being cracked or torn when the panels are bulged or the solar heat collector is in use, and also serve to uniformize the flow of the heat-transfer medium through the passages. A plurality of other circular or oblong welded spots may be provided in spaced relation to the circular or oblong welded seams in the longitudinal direction thereof to uniformize the shape of headers of the solar heat collector and increase the mechanical strength of the headers. When the high-pressure is introduced between the welded panels, the panels are placed between a pair of spaced rigid surfaces to prevent excessive bulging of the panels.

4 Claims, 8 Drawing Figures

SOLAR HEAT COLLECTOR

BACKGROUND OF THE INVENTION

The present invention relates to a solar heat collector, and more particularly to a solar heat collector for heating a heat-transfer medium such as water with the solar heat.

Solar heat collectors mounted on roofs have found wide use as an energy saver for supplying solar-heated water to bathrooms and kitchens. Such solar heat collectors have heat absorbing panels having passages through which a heat-transfer fluid flows. One type of solar heat collector is composed of a pair of heat absorbing panels pressed to jointly define therebetween a plurality of parallel passages or channels for passage therethrough of a heat-transfer fluid. According to another solar collector construction, a pair of heat absorbing panels are overlapped one on the other, and are welded together along parallel lines with a laser beam, and then a fluid under high pressure is forced in between the welded panels to deform them until panel portions between the welded seams bulge thus forming fluid passages and a header. With the solar heat collector of the latter type, localized stresses tend to be imposed on the ends of the parallel welded seams defining the fluid passages and the seam ends are liable to get cracked when the high-pressure fluid is introduced or the solar heat collector thus fabricated is in use. Therefore, such unwanted cracks render the fabrication of the solar heat collector subject to a poor yield, or the solar heat collector apt to malfunction while in use. Furthermore, the portions of the panels which define the fluid passages and header are prone to irregular plastic deformation when they are to bulge under the pressure of the introduced fluid, so that the header and adjacent areas of the fabricated solar heat collector will have uneven deformations.

SUMMARY OF THE INVENTION

Accordingly, it is an object of the present invention to provide a solar heat collector including solar collector panels having improved welded seams defining fluid passages, which welded seams will be free from cracks or damages when the solar collector panels are formed or the solar heat collector is in use.

Another object of the present invention is to provide a solar heat collector including solar collector panels having improved ends and adjacent areas of welded seams defining fluid passages, which ends and adjacent areas will be free from cracks or damages when the solar collector panels are formed or the solar heat collector is in use and which are prevented from being irregularly deformed when the solar collector panels are formed.

According to the present invention, a solar heat collector comprises a pair of solar collector panels welded along a plurality of first spaced seams defining a plurality of parallel passages or channels for passage therethrough of a heat-transfer medium, the solar collector panels having a plurality of second circular or oblong welded seams at the ends of the first spaced seams. The second circular or oblong seams serve to prevent the ends of the first spaced seams from being cracked or torn, and also serve as restrictors for the heat-transfer medium flowing from an inlet header into the passages and from the passages into an outlet header to supply the heat-transfer medium in a constant amount into the parallel passages for allowing the heat-transfer medium to be heated uniformly before it flows into the outlet header. The ends of the first spaced seams having the second circular or oblong welded seams are staggered out of transverse alignment, and side portions of the solar heat collector which define the headers have corrugated welded seams curved in conformity with the staggered arrangement of the ends of the first welded seams. With this construction, when a fluid under pressure is introduced between the panels to bulge them for forming the passages, the headers are deformed substantially to the same degree and width as those of the parallel passages.

Further according to the present invention, a solar heat collector comprises a pair of solar collector panels welded along a plurality of first spaced seams defining a plurality of parallel passages or channels for passage therethrough of a heat-transfer medium, the solar collector panels having a plurality of second circular or oblong welded seams at the staggered ends of the first spaced seams and a plurality of third circular or oblong welded spots spaced from the second welded seams longitudinally thereof. The second circular or oblong seams serve to prevent the ends of the first spaced seams from being cracked or torn, and also serve as restrictors for the heat-transfer medium flowing from an inlet header into the passages and from the passages into an outlet header to supply the heat-transfer medium in a constant amount into the parallel passages for allowing the heat-transfer medium to be heated uniformly before it flows into the outlet header. The third welded spots serve to prevent the headers from being irregularly deformed when the panels are forced to bulge under the pressure of a high-pressure fluid introduced between the panels, and also allow the passages through the headers to be wider and sufficiently strong mechanically. The ends of the first spaced seams having the second circular or oblong welded seams are staggered out of transverse alignment, and the third welded spots are staggered out of transverse alignment in complementary relation to the second circular or oblong welded seams. Furthermore, side portions of the solar heat collector which define the headers have corrugated welded seams curved in conformity with the staggered arrangement of the ends of the first welded seams. With this construction, when a fluid under pressure is introduced between the panels to bulge them for forming the passages, the headers are deformed substantially to the same degree and width as those of the parallel passages.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
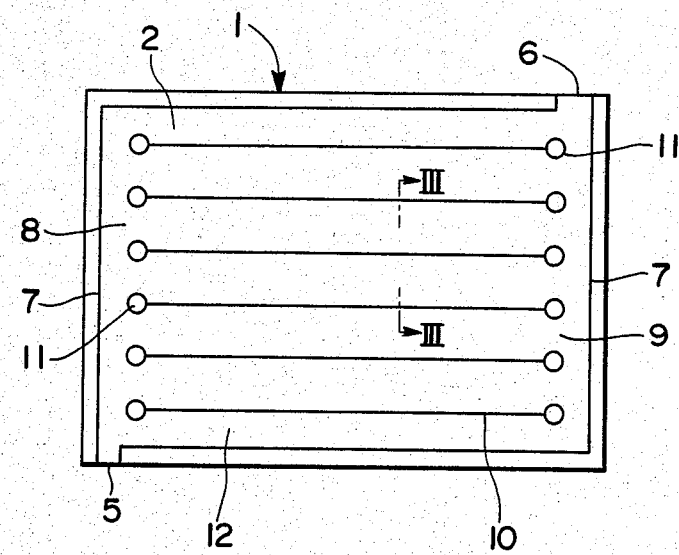
FIG. 1 is a plan view of a solar heat collector according to an embodiment of the present invention.
Figure 3:
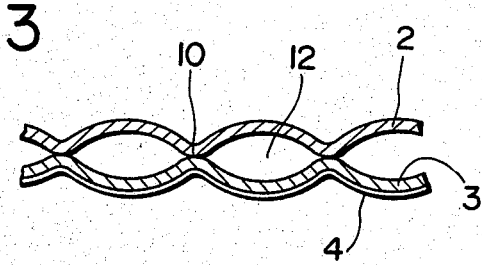
FIG. 3 is an enlarged cross-sectional view taken along line III—III of FIG. 1.

As shown in FIGS. 1 and 3, a solar heat collector 1 comprises a pair of overlapped solar collector panels 2, 3 of metal having a predetermined shape. At least one of the panels 3 has on its outer surface a selective surface coating 4 for higher solar radiation absorption.

The overlapped solar collector panels 2, 3 are welded together by a laser beam along two peripheral seams 7, 7 with an inlet 5 and an outlet 6 being left at diagonally opposite corners. The space bounded by the welded seams 7, 7 between the panels 2, 3 can communicate with the exterior only through the inlet 5 and the outlet 6. The solar collector panels 2, 3 are also welded together by a laser beam along a plurality of first parallel, equally spaced seams 10 extending between the opposite side seams 7, 7 with headers 8, 9 left leading to the inlet 5 and the outlet 6, respectively.

Figure 2:
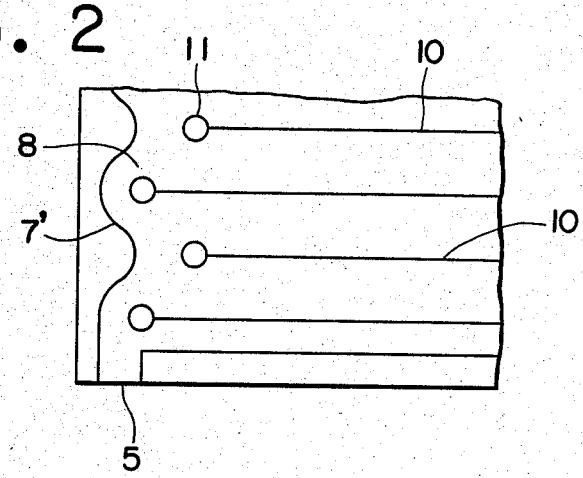
FIG. 2 is an enlarged fragmentary plan view of a solar heat collector according to another embodiment of the present invention.

As illustrated in FIGS. 1 and 2, each of the first welded seams 10 has on its ends a pair of second welded seams 11 of a circular or oblong profile. Each second circular or oblong welded seam 11 should preferably be of a diameter transversely of the first welded seams 10 which is ⅛ to ⅜ of the width between adjacent first welded seams 10. As shown in FIG. 2, the ends of the first welded seams 10 may be staggered out of alignment in the transverse direction, and a welded seam 7' may be corrugated substantially in conformity with the staggered arrangement of the ends of the welded seams 10.

After the welded seams 7 or 7' and the welded seams 10, 11 have been formed, a fluid under pressure is introduced from the inlet 5 into the space between the panels 2, 3 to cause the panel portions between the welded side edges 7 and the welded seams 10 to bulge outwardly under the pressure of the introduced fluid until passages or channels 12 are defined for passage therethrough of a heat-transfer medium. One of the passages 12 extends through the header 8 connected to the inlet 5. Another one of the passages 12 extends through the header 9 connected to the outlet 6. The remaining passages 12 extend between the headers 8 and 9. The second welded seams 11 prevent the ends of the first welded seams 10 from being cracked when the panels 2, 3 are forced to bulge by the pressurized fluid, and restrict inlet and outlet ends of the passages 12 between the first welded seams 10 for thereby causing a heat-transfer medium to flow into such passages 12 substantially in a uniform amount.

The heat-transfer medium, which may be water for example, is supplied from the inlet 5 into the header 3, then filled in the passages 12 extending between the headers 8, 9, and finally discharged through the header 9 out of the outlet 6. While the heat-transfer medium flows through the passages 12, it is heated by solar radiation. The heat-transfer medium as it flows out of the outlet 6 therefore has a higher temperature. The heated heat-transfer medium is then fed to a hot-water supply system or a heater for utilizing the heat of the heat-transfer medium. Where a high-pressure fluid is employed as the heat-transfer medium, the second welded seams 11 serve to prevent the first welded seams 10 from being torn from their ends.

While in the above illustrated embodiment the inlet 5 and the outlet 6 are located in diagonally opposite relation across the solar heat collector 1, they may be positioned otherwise. For example, the inlet 5 and the outlet 6 may comprise pipes welded in holes preformed in the solar collector panels 2, 3.

Figure 4:
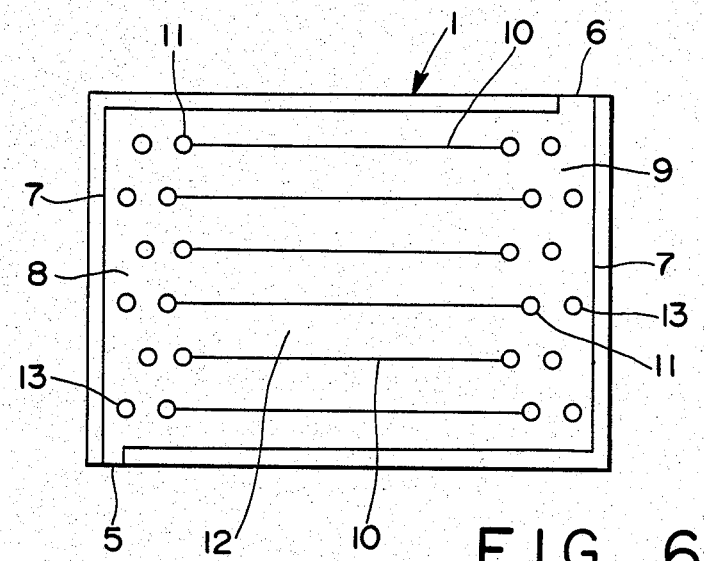
FIG. 4 is a plan view of a solar heat collector in accordance with a still another embodiment of the present invention.
Figure 5:
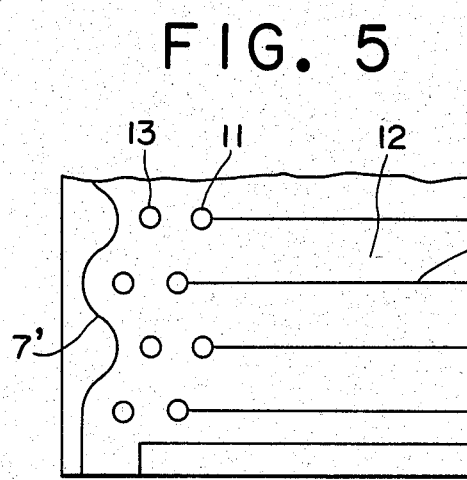
FIG. 5 is an enlarged fragmentary plan view of a solar heat collector according to a still further embodiment of the present invention.

FIGS. 4 and 5 show a solar heat collector according to another embodiment. A solar heat collector 1 comprises a pair of overlapped solar collector panels 2, 3 of metal having a predetermined shape, as shown in FIG. 3. At least one of the panels 3 has on its outer surface a selective surface coating for higher solar radiation absorption. The overlapped solar collector panels 2, 3 are welded together by a laser beam at two peripheral seams 7, 7 with an inlet 5 and an outlet 6 being left at diagonally opposite corners. The space bounded by the welded seams 7, 7 between the panels 2, 3 can communicate with the exterior only through the inlet 5 and the outlet 6. The solar collector panels 2, 3 are also welded together by a laser beam along a plurality of first parallel, equally spaced seams 10 extending between the opposite seams 7, 7 with headers 8, 9 left leading to the inlet 5 and the outlet 6, respectively.

As illustrated in FIGS. 4 and 5, the first welded seams 10 have ends staggered out of alignment in the transverse direction. Each of the first welded seams 10 has on its ends a pair of second welded areas 11 of a circular or oblong profile. Because of the staggered ends of the first welded seams 10, the second welded seams 11 can be relatively large in size for increased mechanical strength. A plurality of third circular or oblong welded spots 13 are spaced from the second welded seams 11 in longitudinal alignment with the first welded seams 10. The third welded spots 13 are also staggered transversely out of alignment with each other substantially in conformity with the staggered arrangement of the second welded seams 11. In the embodiment shown in FIGS. 4 and 5, the headers 8, 9 are rendered larger in dimension by the third welded spots 13 formed therein. The third welded spots 13 serve to prevent the headers 8, 9 from bulging unevenly in a process of forming heat-transfer medium passages as described later on. As shown in FIG. 5, each welded seam 7' may be corrugated to allow the headers 8, 9 and heat-transfer medium passages to be deformed evenly with uniform widths.

After the welded seams 7 or 7' and the welded seams 10, 11 have been formed, a fluid under pressure is introduced from the inlet 5 into the space between the panels 2, 3 to cause the panel portions between the welded seams 7 and the welded seams 10 to bulge outwardly under the pressure of the introduced fluid until passages or channels 12 are defined for passage therethrough of a heat-transfer medium. One of the passages 12 extends through the header 8 connected to the inlet 5. Another one of the passages 12 extends through the header 9 connected to the outlet 6. The remaining passages 12 extend between the headers 8 and 9. The second welded seams 11 prevent the ends of the first welded seams 10 from being cracked when the panels 2, 3 are forced to bulge by the pressurized fluid, and restrict inlet and outlet ends of the passages 12 between the first welded seams 10 for thereby causing a heat-transfer medium to flow into such passages 12 substantially in a uniform amount. The staggered ends of the first welded seams 10 are effective in enabling the second welded seams 11 to have a larger size for increased mechanical strength. The third welded spots 13 allow the passages 12 through the headers 8, 9 to be larger in size and prevent unwanted bulging of the panels 2, 3 at the headers 8, 9.

The heat-transfer medium, which may be water for example, is supplied from the inlet 5 into the header 3, then filled in the passages 12 extending between the headers 8, 9, and finally discharged through the header 9 out of the outlet 6. While the heat-transfer medium flows through the passages 12, it is heated by solar radiation. The heat-transfer medium as it flows out of the outlet 6 therefore has a higher temperature. The heated heat-transfer medium is then fed to a hot-water supply system or a heater for utilizing the heat of the heat-transfer medium. Where a high-pressure fluid is employed as the heat-transfer medium, the second welded seams 11 serve to prevent the first welded seams 10 from being torn form their ends.

The inlet 5 and the outlet 6 may comprise pipes welded in holes preformed in the solar collector panels 2, 3. The circular or oblong welded areas and spots 11, 13 should preferably have a diameter transverse of the first welded seams 10 which is ⅛ to ⅜ of the width of adjacent first welded seams 10.

Figure 6:
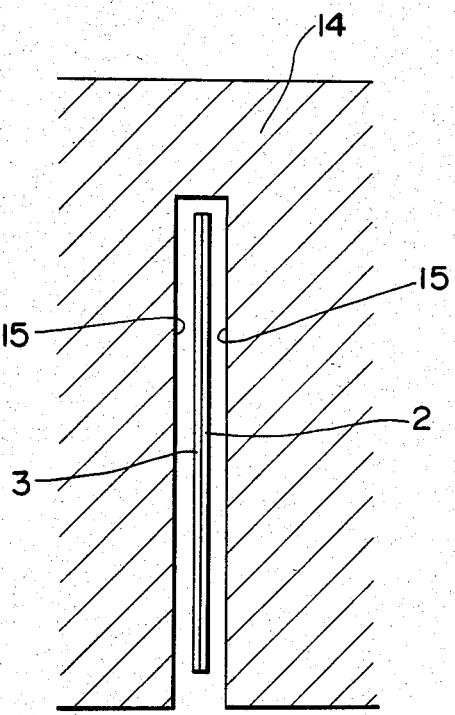
FIG. 6 is a fragmentary cross-sectional view of panels inserted between wall surfaces of a rigid body.

A process of deforming the panels 2, 3 into the bulged configuration will be described with reference to FIG. 6.

After the panels 2, 3 have been welded by a laser beam, the panels 2, 3 are inserted in between opposite spaced surfaces 15, 15 of a rigid body 14. Where the total thickness of the panels 2, 3 is 0.6 mm, the distance between the spaced surfaces 15, 15 should be up to 1.5 mm.

With the panels 2, 3 placed between the opposite spaced surfaces 15, 15, a fluid under pressure is forced through the inlet 5 into the space between the panels 2, 3. The outlet 6 is sealed off at this time. The introduced fluid under pressure causes the panel portions between the welded seams 7 and the welded seams 10 to bulge outwardly under the pressure of the introduced fluid until passages or channels 12 are defined for passage therethrough of a heat-transfer medium. One of the passages 12 extends through the header 8 connected to the inlet 5. Another one of the passages 12 extends through the header 9 connected to the outlet 6. The remaining passages 12 extend between the headers 8 and 9. Since the seams 7, 10 welded by a laser beam have quite a small width, the passages 12 defined therebetween have an increased width. When the high-pressure fluid is introduced between the panels 2, 3, wider passage portions tend to bulge earlier beyond a predetermined height, but are prevented by the opposite spaced surfaces 15, 15 of the rigid body 14 from projecting beyond such a desired height. As a result, the pressurized fluid is forced to enter narrower passage portions to form passages of a desired dimension and shape.

The opposite spaced surfaces 15, 15 of the rigid body 14 prevent the solar heat collector from being bodily bent or curved, and hence enable the solar heat collector to be shaped as a flat overall structure. The process of bulging the panels 2, 3 under the pressure of the pressurized fluid may be composed of a first step of introducing the high-pressure fluid between the panels 2, 3 inserted between opposite surfaces of a rigid body which are spaced a smaller distance, and a second step of introducing the high-pressure fluid between the panels 2, 3 placed between the opposite rigid body surfaces which are spaced a larger distance. Such a multistep process is more effective in forming a flat solar heat collector against undesired deformations.

Figure 7:
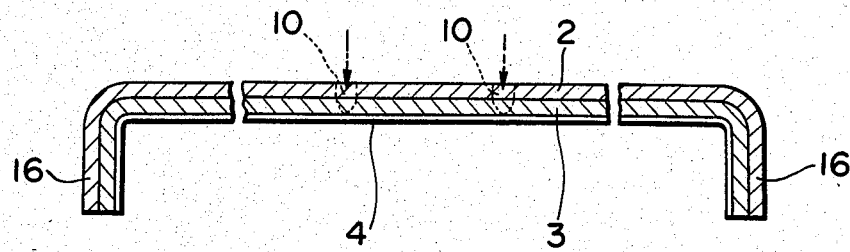
FIG. 7 is a cross-sectional view of a pair of flanged panels overlapped one on the other.
Figure 8:
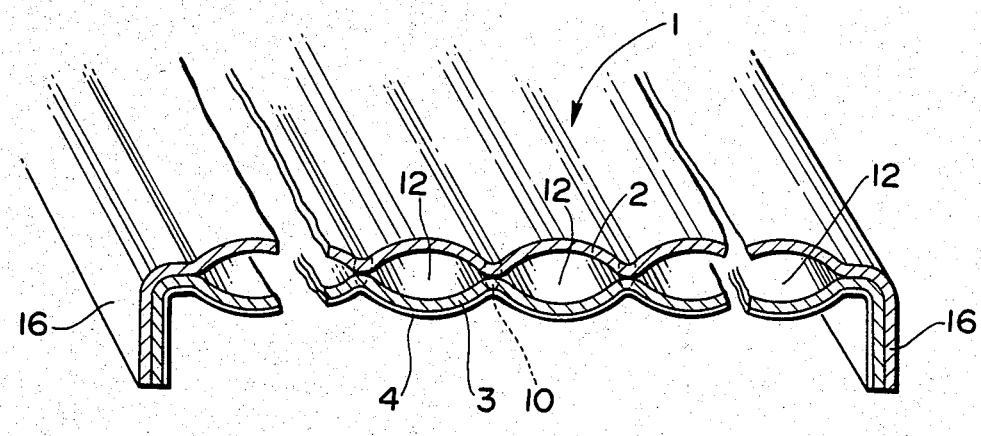
FIG. 8 is a fragmentary perspective view of the flanged panels of FIG. 7 as they bulge under the pressure of a high-pressure fluid introduced between welded seams.

As shown in FIG. 7, a pair of solar collector panels 2, 3 have bent side flanges 16, 16 extending longitudinally thereof. The side flanges 16, 16 prevent the panels 2, 3 from being warped or bent under the pressure built up between the panels 2, 3 when they are bulged into a solar collector construction as shown in FIG. 8. The solar heater collector 1 thus fabricated has a required degree of flatness free from warps which would otherwise result from the panel bulging process. The side flanges 16, 16 double as attachments for being fastened to a base or casing for the solar heat collector 1. Therefore, no additional attachments are necessary.

Although certain preferred embodiments have been shown and described in detail, it should be understood that many changes and modifications may be made therein without departing from the scope of the appended claims.

What is claimed is:

1. A solar heat collector comprising a pair of overlapped solar collector panels having a plurality of spaced welded seams defining therebetween a plurality of passages for a heat-transferring medium;
    a plurality of circular or oblong welded seams at the ends of said spaced welded seams to prevent the ends of said first spaced seams from being cracked or torn when the panels are forced to bulge under pressure and also serving as flow restrictors for a heat transfer medium, wherein said ends of said spaced welded seams are staggered out of alignment transversely thereof;
    a plurality of circular or oblong welded spots spaced from said circular or oblong welded seams in the longitudinal direction of said spaced welded seams to prevent the headers from being irregularly deformed when the panels are forced to bulge under pressure; and
    two peripheral seams having an inlet and an outlet located at diagonally opposite ends.

2. The solar heat collector in claim 1, wherein said two peripheral seams located at header sides comprise corrugated seams.

3. A solar heat collector according to claim 1, wherein said solar collector panels have a pair of bent flanges extending along opposite sides thereof.

4. A method of fabricating a solar heat collector, comprising the steps of:
    welding a pair of overlapped metal panels by a laser beam along a plurality of spaced seams;
    welding a plurality of circular or oblong seams at the end of said spaced welded seams to prevent the ends of said first spaced seams from being cracked or torn when the panels are forced to bulge under pressure and also serving as flow restrictors for a heat transfer medium;
    welding a plurality of circular or oblong spots spaced from said circular or oblong seams in the longitudinal direction of said spaced welded seams to prevent the headers from being irregularly deformed when the panels are forced to bulge under pressure;
    placing said overlapped metal panels thus welded between a pair of opposite rigid surfaces; and
    thereafter, applying a pressure between said overlapped metal panels placed between said rigid surfaces to bulge panel portions between said spaced seams for defining a plurality of passages between said overlapped metal panels.

* * * * *